United States Patent [19]

Okamura

[11] Patent Number: 5,795,689
[45] Date of Patent: Aug. 18, 1998

[54] METHOD OF MAKING A PRINTING PLATE FOR NEWSPAPER PRINTING

[75] Inventor: Yuichi Okamura, Osaka-fu, Japan

[73] Assignee: Kabushiki Kaisha Kikai Seisakusho, Osaka-fu, Japan

[21] Appl. No.: 697,726

[22] Filed: Aug. 29, 1996

[30] Foreign Application Priority Data

Aug. 30, 1995 [JP] Japan ................................. 7-222141

[51] Int. Cl.$^6$ ........................................... G03G 13/26
[52] U.S. Cl. ................................... 430/49; 430/44
[58] Field of Search ............................. 430/44, 49

[56] References Cited

U.S. PATENT DOCUMENTS

| 4,149,798 | 4/1979 | McGowan et al. | 430/41 |
| 5,519,469 | 5/1996 | Obata | 430/44 |

Primary Examiner—John Goodrow
Attorney, Agent, or Firm—Millen, White, Zelano & Branigan, P.C.

[57] ABSTRACT

By increasing the printing-plate-making speed in a laser-direct-drawing-from-computer type plate making system, the plate size can be increased without large-scale expansion of the plate making facilities, and the operation time of the rotary press is thereby improved to increase the number of newspaper prints. The invention provides a printing-plate-making method for newspaper printing designed to enable figure-drawing corresponding to drawing image signals from an electronic computer by laser beam. A plurality of laser scanning heads are provided in an electrostatic charging and figure-drawing image signals from the electronic computer to draw similar or different figures on a plurality of plates in parallel. The plates thus drawn are then subjected to a developing and fixing section, an elution section, post-treatment section, etc.

1 Claim, 7 Drawing Sheets

METHOD OF MAKING A PRINTING PLATE FOR NEWSPAPER PRINTING

This Application is related to Japanese Patent Application No. 7-222141, filed Aug. 30, 1995, the entire disclosure of which is incorporated by reference herein.

BACKGROUND OF THE INVENTION

1. Field of the Invention

The invention relates to a method of making printing plates in which a laser scanning head is controlled by drawing-image signals received from a computer and a desired figure is drawn directly on the plate. The invention can be used, e.g., in printing newspapers and the like.

2. Description of the Prior Art

The printing plate used for offset printing in rotary presses for newspaper printing has hitherto been made in the prior art by a method of photographing drawing information such as characters, photos, etc., onto plate-making film using a film plotter or film processor and exposing the PS plate (by color plate-making, etc.) using that plate-making film.

However, with recent progress in the technology of information-processing and image-processing by computer, a printing plate making method for newspaper printing in which figures are drawn directly on the plate by laser with drawing image signals from computer has been developed and put into practical use in the field of newspaper printing, etc.

FIG. 7 shows one example of this kind of conventional printing plate making process for newspaper printing. The plate-making process uses a plate-feeding section A, electrostatic charge and drawing section B, plate discharging section C, developing and fixing section D, elution section E, post-treatment section F, and punching and bending section G.

At the said plate-feeding section A, a pallet carrying a plurality of plates of a specified size is installed, and these plates are sent to the electrostatic charge and drawing section B one at a time. The plate comprises a so-called "OPC plate" which is about 0.3 mm thick with specified dimensions and has an organic photoconductor (OPC) layer formed on an aluminum supporter plate. Alternatively, the plate can be, for instance, a high-sensitivity photopolymer plate, silver salt plate, silver salt+diazohybrid plate, or thermosensitive plater, each placed on the aluminum supporter plate.

In the said electrostatic charge and drawings section B, the plate 1 is first fixed to a specified position on the plate bed, and then the plate bed is moved below a linear type corona discharge electrode (not shown) in the direction perpendicular to this electrode at a specified speed. A positive charge is thereby given to the OPC layer surface of the plate 1 by corona discharge.

When the charging treatment of the OPC layer is finished, the plate bed is returned to the initial position, and drawing treatment immediately follows.

That is, from a computer (not shown), so-called drawing image signals (digital signals) are sent to the electrostatic charge and drawing section B, and the operation of the laser scanning head H is controlled by these signals. More specifically, the positively charged OPC layer is scanned by the semiconductor laser of 780 nm wavelength irradiated from the said laser scanning head, allowing so-called high-speed scanning drawing to take place.

When laser light is applied, a carrier is generated inside the OPC layer and positive charge on the surface is erased by the carrier, thereby forming electrostatic images, which correspond to figures.

High-speed scanning drawing by laser is carried out by two processes: primary scanning by plane-scanning system and secondary scanning of a feed screw system (transportation of a plate bed) by an AC servo motor. The scanning line density is a three-stage change-over system of 454, 602, and 909 lines-per-inch (LPI) and the scanning speed is 40,000 lines-per-minute (LPM).

More specifically, the primary scanning system is a plane scanning system combining a polygon mirror (eight-sided mirror, 5000 rotations) with F θ lens. The modulation system is a current direct modulation, and is designed to directly irradiate the plate surface with a beam of light.

As a result, for example, if the margins at the top and the bottom are 9.7 mm, respcetively, and a 10-column article portion (total scanning lines: about 6,675 when scanning at 454 LPI) and a 5-column advertising portion (total scanning lines: about 4,470 when scanning at 602 LPI) are scanned, about 33.4 seconds (11,145 lines/40,000×60) are required for scanning time.

The plate 1 with the electrostatic latent image corresponding to the newspaper columns is released from a vacuum condition at the plate discharging section C and at the same time is lifted by a plate discharging handler (not shown) and sent to the developing and fixing section D.

By the so-called "reverse image" method, positively charged toner particles are allowed to adhere to the electrostatic latent image portion and development of the electrostatic latent image takes place.

The developed toner particle are subsequently heated by, e.g., a halogen lamp and fixation of toner particles take place.

The plate processed at the developing and fixing section D is subsequently sent to the elution section E, where, using an alkaline liquid, the OPC layer other than the fixed toner image is removed to form a printing surface for printing.

The plate 1 with the toner image section (printing plate surface) formed thereon further undergoes a rinsing treatment of plate's surface and an application of rubber liquid to the plate's surface at the post-treatment section E, thereby subjecting the printing plate surface to the so-called "protection treatment."

Thereafter, at the punching and bending section G, the plate is notched and/or bent so that it can be mounted to a printing cylinder of a rotary press, and the plate is then conveyed to a storage Q, etc. as a finished printing plate for printing.

SUMMARY OF THE INVENTION

In making a printing plate for printing of a direct drawing system shown in FIG. 7, as described above, it takes about 50–60 seconds to subject the plate to the charging treatment and draw figures for one page of newspaper, and about 195–205 seconds are further required for other treatments such as developing and fixing or punching and bending, thus requiring about 255 seconds (4 minutes and 15 seconds) to complete a first printing plate.

On the other hand, in recent newspaper printing, there is a great need for improvement in printing efficiency and a large number of newspapers must be printed in a short time.

However, in order to print a large number of newspapers in a short time, the time of non-operation (the "down-time") of the rotary press must be shortened, and, for example, it is necessary to shorten the plate exchanging time by increasing the size of the printing plate, thereby reducing the number of plates which need to be exchanged in one printing. This is because reducing the number of plates which are exchanged enables shortening of the time required to mount the printing plate.

However, if the size of the plate 1 is increased and (for example) a plate 1 covering two pages of newspaper (1W× 1L×2) is made as shown in FIG. 9 in place of the plate 1 for one newspaper page (width W for 1 page×length L for 1 page) as shown in FIG. 8, or the plate 1 for two pages of newspaper (1W×2L) as shown in FIG. 10 is replaced by the plate 1 for four pages of newspaper (1W×2L×2) as shown in FIG. 11, assuming that the treatment time except for the charging and figure drawing process B is the same, the mean time required for completing a plate is 315 seconds (60 sec.×2+195 sec.) for the plate 1 in FIG. 9 as opposed to 255 seconds (60 sec.+195 sec.) for the plate 1 in FIG. 8, while it takes about 435 seconds (60 sec.×4+195 sec.) for the plate 1 of FIG. 11 as opposed to about 315 seconds (60 sec.×2+ 195 sec.) for the plate 1 of FIG. 10.

As a result, even if the printing plate mounting time can be reduced by about half for one printing by increasing the size of the printing plate (for example, by doubling the conventional size), the supply of printing plates is restricted from the viewpoint of the printing plate making speed, creating a problem that the facilities for plate making equipment must be greatly expanded.

In making the printing plate by the direct drawing system of FIG. 7 above, electrostatic charging of the OPC layer takes place from the bottom side of the plate 1. After charging, drawing by laser takes place from the top side of the plate 1; there is, therefore, a time difference of about 50 to 60-seconds between electrostatic charging and incidence of the laser light upon the OPC layer due to the distance between the top and the bottom of the plate 1.

On the other hand, the positive electric charge on the OPC layer is subject to increased leakage (attenuation rate) as time passes, causing the toner to deposit in a speckled form on the plate surface in the developing process, and this results in a degradation of the quality of the plate surface.

As a result, when the plate is elongated (as shown in FIG. 10, for example) and the distance between the top and bottom of the plate causes a larger time difference between charging and incidence by laser light, a problem arises in that the speckles of deposited toner become larger.

Accordingly, it is an object of the present invention to provide a method for making printing plates by laser for newspaper printing which can solve problems as described above in conventional plate making of the direct drawing system by laser using the OPC machine plate 1. These problems, in summary, are that (1) even if the printing plate size is increased to reduce the required number of plates, thereby shortening the time required for exchanging the plates so that the rate of operation of the rotary press is increased, the supply of printing plates is restricted form the viewpoint of plate-making speed, and particularly the charging and figure drawing speed, with the result that it is not possible to increase the number of printings, and (2) it is difficult to increase the size of the plate because the time difference between charging and incidence of the laser on the plate causes the deposit in a speckled form in the developing process. By solving the above problems, it is another object of this invention to make machine plates of larger size and a higher quality at a faster rate.

The present invention relates to methods for making printing plates for newspaper printing wherein figures are directly drawn by laser beam, in accordance with figure-drawing image signals S from an electronic computer, upon a plate which has been conveyed from a plate-feeding section A to an electrostatic charging and figure-drawing section B, and wherein the printing plate, having plate surfaces with desired figures formed thereon, is subjected to treatments at the developing and fixing section D, elution section E, post-treatment section F, etc. According to the invention, a plurality of laser scanning heads H are installed at the charging and figure-drawing section B, and the laser scanning heads are operated simultaneously according to figure-drawing image signals S from an electronic computer, whereby identical or different figures are drawn on a plurality of plates at the same time.

BEST MODE FOR CARRYING OUT THE INVENTION

Figure 1:
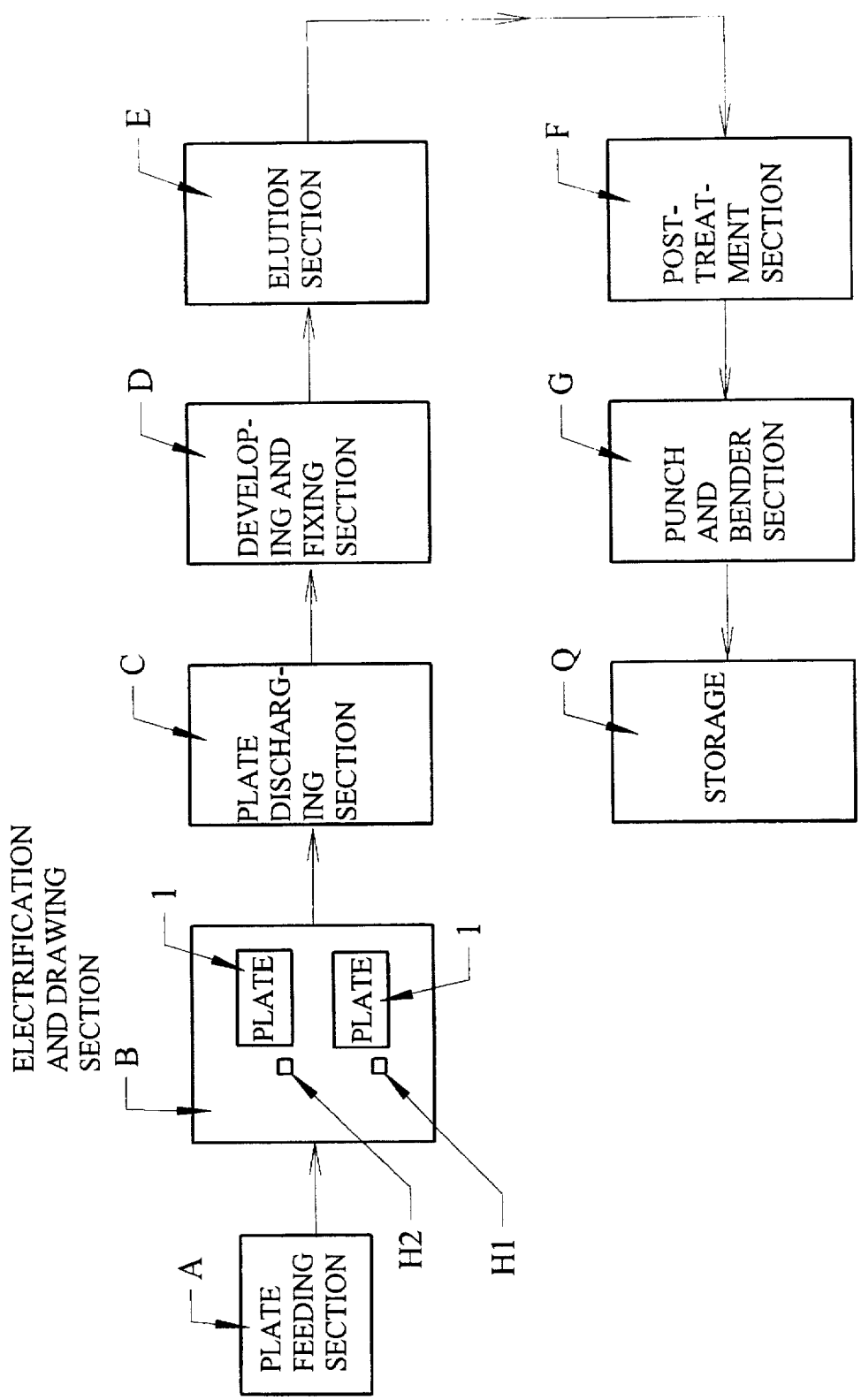
FIG. 1 is a block diagram of the printing plate making method using a direct drawing system according to the present invention.

Referring now to the drawings, the method of the invention for making printing plates for newspaper printing will be described in detail hereinafter.

Figure 7:
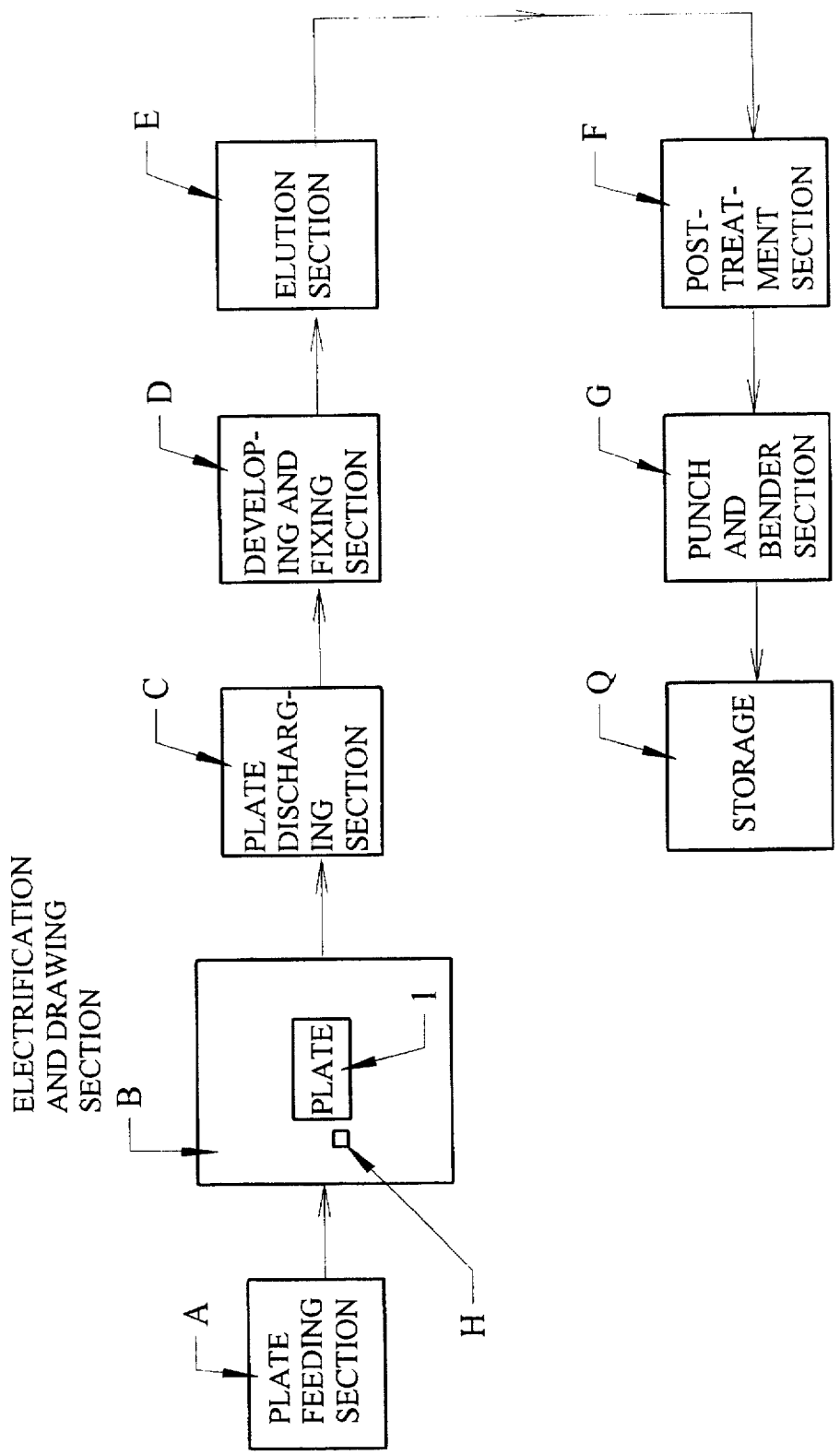
FIG. 7 is an illustration explaining the conventional process of printing plate making by the "direct drawing by laser" method.
Figure 8:
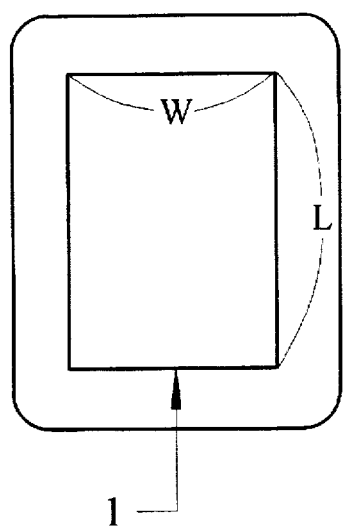
FIG. 8 is an illustration showing one example of a plate for one page of newspaper.
Figure 9:
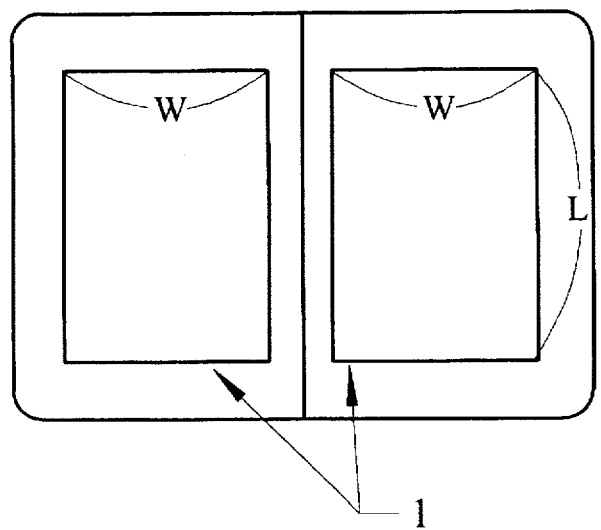
FIG. 9 is an illustration showing one example of a plate for two pages of newspaper.
Figure 10:
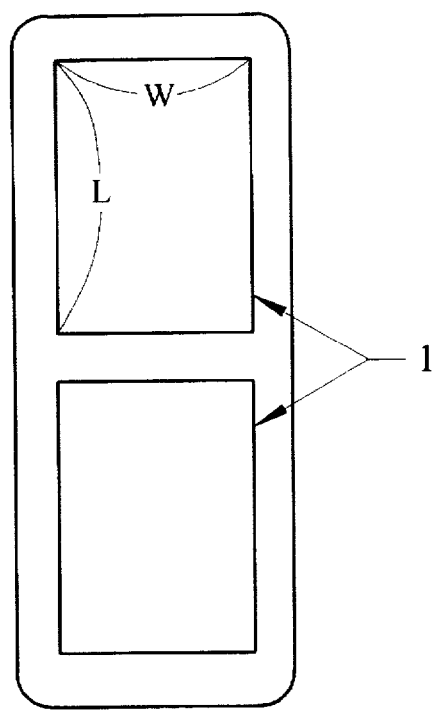
FIG. 10 is an illustration showing another example of a plate for two pages of newspaper.
Figure 11:
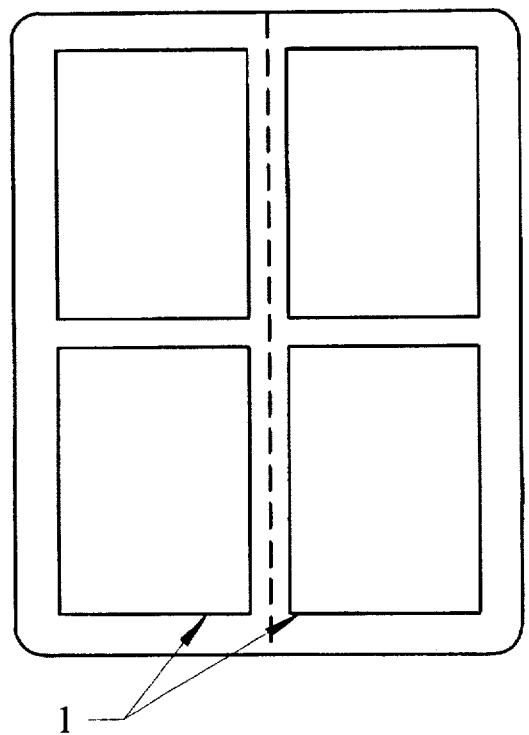
FIG. 11 is an illustration showing one example of a plate for four pages of newspaper.

FIG. 1 is a block diagram showing one example of the embodiment of the present invention, and the parts excluding the electric charging and figure drawing section B are the same as those in the block diagram of FIG. 7 illustrating a conventional plate making method.

In the present invention, the exterior form dimensions of the plate bed of electric charging and figure drawing section B and those of a fixing plate are enlarged to permit arrangement of the OPC plate 1 as shown in FIG. 2, FIG. 3, FIG. 4 and FIG. 5.

Figure 6:
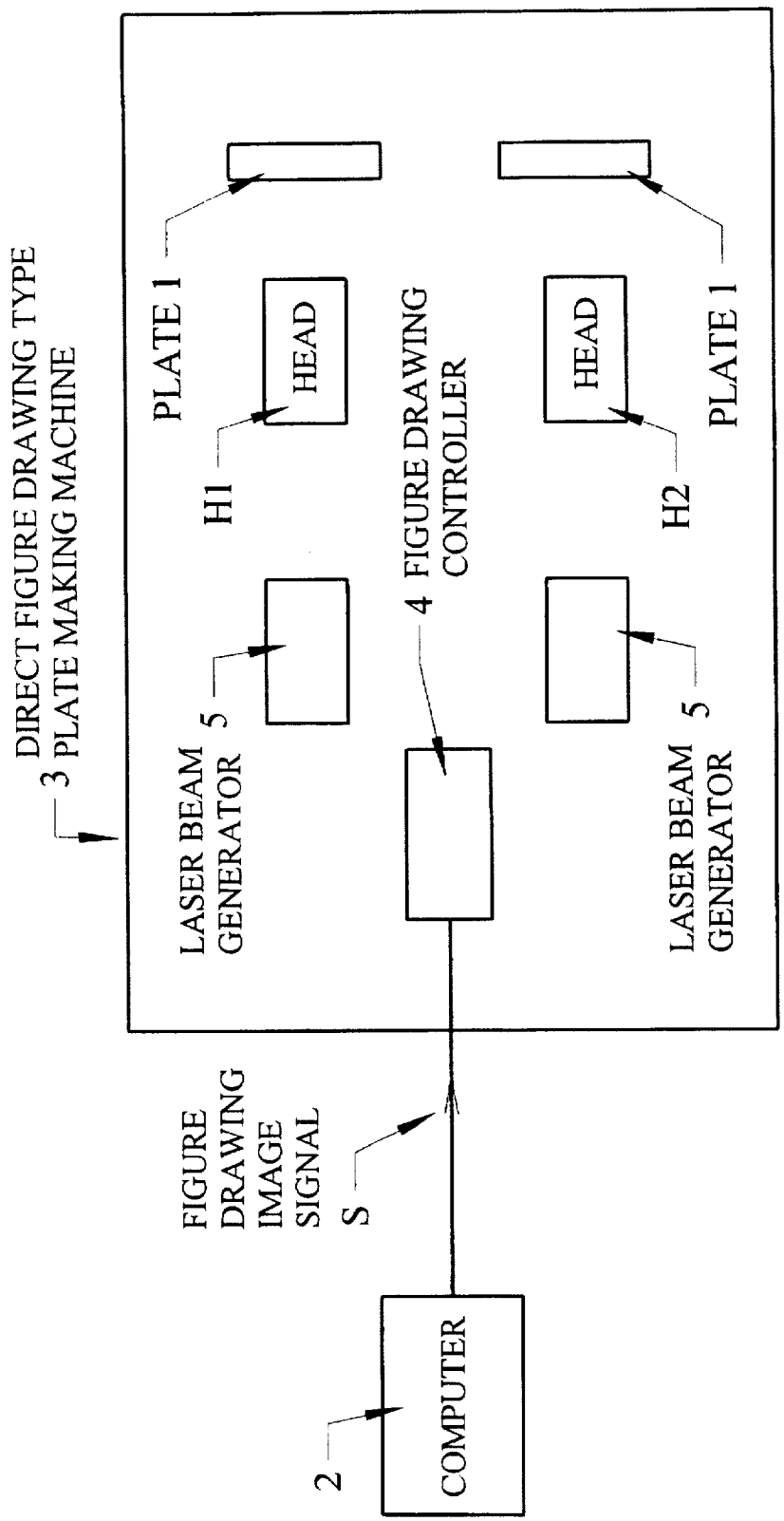
FIG. 6 is a chart showing a system for controlling the laser scanning heads at the electrostatic charging and figure drawing section.

In the present invention, two laser beam scanning heads $H_1$, $H_2$ are installed at the electrostatic charging and figure drawing section B, and a figure drawing image signal (digital signal) S is fed to each of the scanning heads $H_1$, $H_2$ via figure drawing controller 4 of the direct figure drawing type plate making machine 3 from a computer 2 for forming printing plates as shown in FIG. 6, and laser scanning corresponding to the image signal S takes place in the OPC layer of the OPC machine plate, thereby enabling the image signal figure to be drawn as an electrostatic latent figure.

In this embodiment, a plate with an organic photoconducting layer is used, but high-sensitivity photopolymer plates, silver salt plates, silver salt+diazo hybrid plates, thermosensible plates, etc. could also be used.

In this embodiment, the so-called plane scanning system is used for the scanning system using a laser beam scanning head H, but in addition to this, the present invention may be able to be applied to the external drum scanning system in which scanning is carried out with the plate wound around the cylinder's external rotating surface or an inner drum scanning system in which scanning takes place with the plate wound around the cylinder drum's rotating inner surface.

In addition, in this embodiment, two laser beam scanning heads H are used, but three or four laser beam scanning heads may be used.

Figure 2:
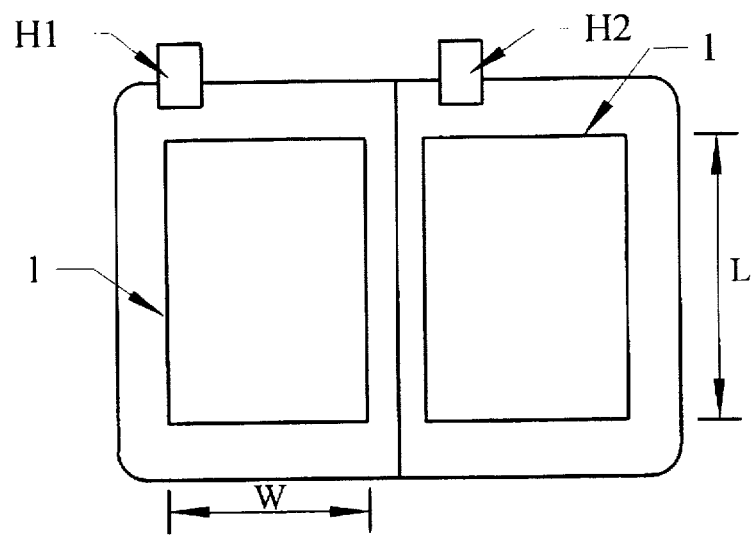
FIG. 2 explains the positional relationship between the plate and the laser scanning head at the electrostatic charging and figure drawing section.

That is, in FIG. 2, two OPC plates 1 each measuring 405 mm wide and 1130 mm long are arranged on the plate bed in parallel and figures are drawn separately and simultaneously with two laser scanning heads $H_1$, $H_2$. Persons skilled in the art will recognize that identical or different figures may be drawn on the two plates; in the former case, the two plates 1 both contain the same articles and are used to print the same page of the newspaper, and in the latter case the two plates 1 contain different newspaper articles and are used to print different pages, which can be drawn in about 60 seconds.

Figure 3:
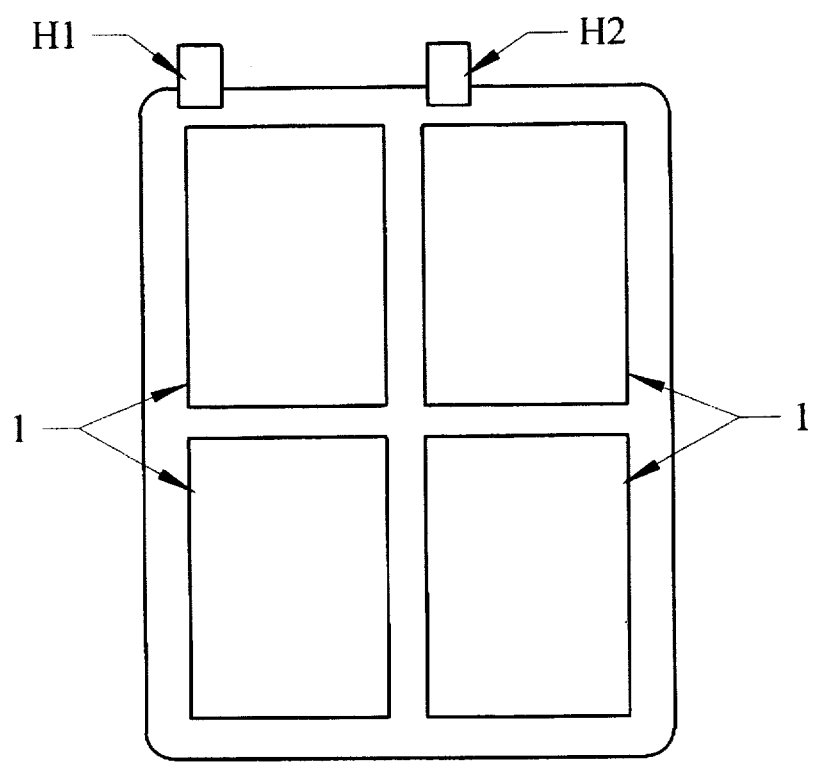
FIG. 3 is an illustration showing another example of the positional relationship between the plate and the laser scanning head at the electrostatic charging and figure drawing section.

In FIG. 3, figures are drawn in parallel on the four plates for four pages each measuring 405 mm wide and 1300 mm long by two laser scanning heads $H_1$, $H_2$, allowing the laser scanning heads $H_1$, $H_2$ to draw in about 120 seconds (60 seconds×2) figures in two sheets (each comprising two pages) of newspaper, with each of the laser scanning heads $H_1$, $H_2$ covering the area having the width corresponding to the width of one page of newspaper and the length corresponding to two pages placed in a row.

Figure 4:
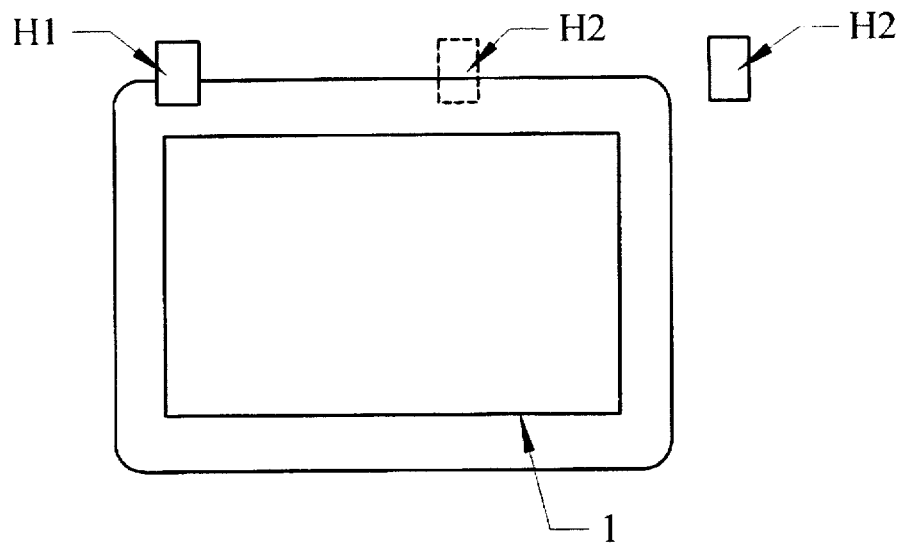
FIG. 4 is an illustration showing still another example of the positional relationship between the plate and the laser scanning head at the electrostatic charging and figure drawing section.

In addition, FIG. 4 shows the formation of a plate for a newspaper which is spread (lateral width 2W, length 1L), and in this case, either one of the laser scanning heads is operated with the other scanning head being held in the waiting position. As a result, the plate 1 for a sheet which is spread can be drawn in about 120 seconds (60 seconds×2).

In FIG. 4, the other scanning head $H_2$ is designed to be held at the waiting position, but by positioning the scanning head $H_2$ at the dotted position and providing a phase at the positions of both heads $H_1$, $H_2$ to superimpose dots, it is possible to make plates completely free of seams using two units of heads $H_1$, $H_2$ even in the case of the sheet which is spread.

Figure 5:
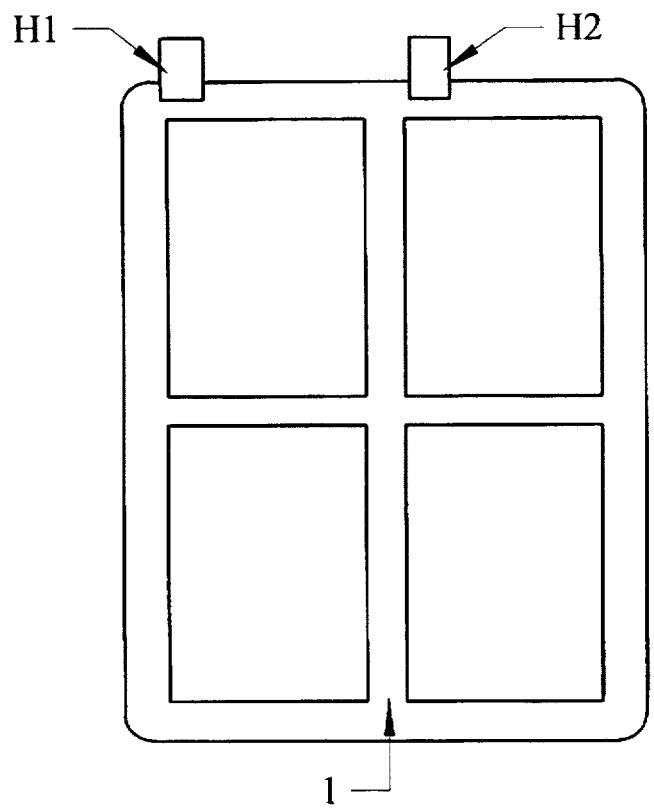
FIG. 5 is an illustration showing another example of the positional relationship between the plate and the laser scanning head at the electrostatic charging and figure drawing section.

FIG. 5 shows the case where the plate 1 for four pages is formed. Operating both scanning heads $H_1$, $H_2$, the plate 1 for four pages can be drawn in about 120 seconds (60 seconds×2). As in the case of FIG. 4, it is possible to draw figures with one scanning head only, with the other scanning head being held at the waiting position, and in such event, about 240-second (60 seconds×4 plates) are required.

In this invention, a plurality of laser scanning heads are provided at the electrostatic charging and figure drawing section, both scanning heads are simultaneously operated, and figures with same or different contents are drawn in parallel on a plurality of plates, respectively. As a result, even for a large-size plate, figure drawing can be completed in a short time, and it becomes possible to increase the production of plates without further expanding the plate making facilities on a large scale.

It also becomes possible to greatly shorten the time for exchanging plates of a rotary press by increasing the size of the plate, thereby improving the operation rate of the rotary press and permit printing of a large number of newspapers.

Furthermore, since the time required for drawing figures on the plate can be shortened, it is possible to reduce the speckling of toner which is attributed to electric charge leakage from the outer surface of the OPC layer in figure drawing, thereby achieving higher-quality plate making.

In addition, this invention can be applied not only to the plate equipped with the OPC layer but also all other direct figure drawing system plates using a computer, and the scanning system is not limited only to the plane scanning system but the invention can be applied to cylinder drum outer surface scanning system and cylinder drum inner surface scanning system, ensuring an extremely high applicability.

This invention achieves outstanding practical effects as described above.

The embodiments of the invention in which an exclusive property or privilege is claimed are defined as follows:

1. A method for making a printing plate for newspaper printing, comprising:

providing an electrostatic figure-drawing section;

receiving first and second plate portions at said electrostatic figure-drawing section;

providing first and second laser scanning heads at said electrostatic figure-drawing section;

generating figure-drawing image signals by electronic computer;

using said first laser scanning head to draw a first figure on said first plate portion in accordance with said figure-drawing image signals while simultaneously using said second laser scanning head to draw a second figure on said second plate portion in accordance with said figure-drawing image signals;

subjecting said first and second plate portions to a developing and fixing treatment; and, subjecting said first and second plate portions to an elution treatment, whereby said first and second figures are made onto said first and second plate portions, respectively;

wherein said first and second plates comprise an organic photoconducting layer; and wherein, said step of drawing a first figure on said first plate portion comprises the step of drawing first and second pages on said first plate portion, and wherein said step of drawing a second figure on said second plate portion comprises the step of drawing third and fourth pages on said second plate portion, said first, second, third, and fourth pages each being different from one another.

* * * * *

UNITED STATES PATENT AND TRADEMARK OFFICE
CERTIFICATE OF CORRECTION

PATENT NO. : 5,795,689
DATED : August 18, 1998
INVENTOR(S) : YUICHI OKAMURA

It is certified that error appears in the above-identified patent and that said Letters Patent is hereby corrected as shown below:

In the coversheet of the patent:

(73) Assignee should read: -- (73) Assignee: KABUSHIKI KAISHA KANEDA KIKAI SEISAKUSHO. OSAKA-FU, JAPAN --.

Signed and Sealed this

Second Day of January, 2001

Attest:

Q. TODD DICKINSON

*Attesting Officer*        *Commissioner of Patents and Trademarks*